United States Patent
Kittleson et al.

(10) Patent No.: US 10,563,524 B2
(45) Date of Patent: Feb. 18, 2020

(54) CERAMIC MATRIX COMPOSITE (CMC) TURBINE BLADES AND METHODS OF FORMING CMC TURBINE BLADES

(71) Applicant: GENERAL ELECTRIC COMPANY, Schenectady, NY (US)

(72) Inventors: Jacob John Kittleson, Greenville, SC (US); Peter De Diego, Saluda, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 237 days.

(21) Appl. No.: 15/622,295

(22) Filed: Jun. 14, 2017

(65) Prior Publication Data

US 2018/0363474 A1    Dec. 20, 2018

(51) Int. Cl.
| | | |
|---|---|---|
| *F01D 5/28* | (2006.01) | |
| *F01D 5/30* | (2006.01) | |
| *C04B 35/80* | (2006.01) | |
| *D03D 1/00* | (2006.01) | |

(52) U.S. Cl.
CPC .............. *F01D 5/282* (2013.01); *C04B 35/80* (2013.01); *D03D 1/00* (2013.01); *F01D 5/284* (2013.01); *F01D 5/3007* (2013.01); *C04B 2235/5256* (2013.01); *F05D 2220/30* (2013.01); *F05D 2230/50* (2013.01); *F05D 2240/30* (2013.01);
(Continued)

(58) Field of Classification Search
CPC .. C04B 35/80; C04B 2235/5256; D03D 1/00; F01D 5/282; F01D 5/284; F01D 5/3007; F05D 2300/6034; F05D 2220/30; F05D 2230/50; F05D 2300/6033; F05D 2240/30
See application file for complete search history.

(56) References Cited

U.S. PATENT DOCUMENTS

| | | | | |
|---|---|---|---|---|
| 4,966,527 A | * | 10/1990 | Merz .................... | B29C 70/202 |
| | | | | 416/230 |
| 7,198,472 B2 | * | 4/2007 | McMillan .............. | F01D 5/147 |
| | | | | 29/889.23 |

(Continued)

FOREIGN PATENT DOCUMENTS

| | | |
|---|---|---|
| EP | 2725192 A2 | 4/2014 |
| EP | 3054096 A1 | 8/2016 |

OTHER PUBLICATIONS

Extended European Search Report issued in connection with corresponding EP Application No. 18166945.8 dated Oct. 4, 2018.

*Primary Examiner* — Justin D Seabe
*Assistant Examiner* — Adam W Brown
(74) *Attorney, Agent, or Firm* — McNees Wallace & Nurick LLC

(57) ABSTRACT

A ceramic matrix composite (CMC) turbine blade includes a root region, a narrowed neck region extending from the root region, and a hub region extending from the narrowed neck region. At least one central CMC ply extending from the root region is interwoven with at least one insert extending toward the narrowed neck region from the hub region. A method of forming a CMC turbine blade includes interweaving at least one central CMC ply extending from the root region with at least one insert extending toward the narrowed neck region from the hub region. The CMC turbine blade includes a root region, a narrowed neck region extending from the root region, and a hub region extending from the narrowed neck region.

20 Claims, 4 Drawing Sheets

(52) U.S. Cl.
 CPC ............ *F05D 2300/6033* (2013.01); *F05D 2300/6034* (2013.01)

(56) References Cited

U.S. PATENT DOCUMENTS

| | | | |
|---|---|---|---|
| 7,549,840 B2* | 6/2009 | Subramanian | C04B 35/573 29/889.2 |
| 9,506,355 B2* | 11/2016 | Nunez | F01D 5/282 |
| 10,132,170 B2* | 11/2018 | Garcia-Crespo | F01D 5/30 |
| 2002/0064456 A1* | 5/2002 | Marlin | B29C 70/34 415/191 |
| 2012/0055609 A1* | 3/2012 | Blanchard | B29C 70/24 156/89.11 |
| 2015/0377046 A1 | 12/2015 | Duelm et al. | |
| 2016/0003072 A1 | 1/2016 | Chang et al. | |

* cited by examiner

CERAMIC MATRIX COMPOSITE (CMC) TURBINE BLADES AND METHODS OF FORMING CMC TURBINE BLADES

STATEMENT REGARDING FEDERALLY SPONSORED RESEARCH

This invention was made with Government support under contract number DE-FC26-05NT42643 awarded by the Department of Energy. The Government has certain rights in the invention.

FIELD OF THE INVENTION

The present embodiments are directed to ceramic matrix composite (CMC) turbine blades. More specifically, the present embodiments are directed to CMC turbine blades with central plies interwoven around inserts and methods of forming such CMC turbine blades.

BACKGROUND OF THE INVENTION

The manufacture of a ceramic matrix composite (CMC) part typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 925 to 1650° C. (1700 to 3000° F.), or electrophoretically depositing a ceramic powder. With respect to turbine airfoils, the CMC may be located over a metal spar to form an outer covering over the metal spar or to form only the outer surface of the airfoil.

Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_1O_3$), or combinations thereof. The CMC may have increased elongation, fracture toughness, thermal shock, dynamic load capability, and anisotropic properties as compared to a monolithic ceramic structure.

Certain conventional CMC blade architectures include an airfoil, a narrowed neck region, and a dovetail to couple the CMC blade to a rotor. Inserts, located between portions of CMC plies at various locations in the airfoil and dovetail, aid in providing an airfoil and a dovetail that are wider than the narrowed neck region between the airfoil and the dovetail. Under certain operational conditions, this architecture may lead to peel or interlaminar tensile (ILT) stresses, which may result in initiation of a crack at or near the mid-plane within the narrowed neck region of the CMC blade. The resulting interlaminar crack tends to propagate radially along the mid-plane of the CMC blade, and the crack may continue to propagate radially past the narrowed neck region along the ply direction or radial direction, ultimately splitting the CMC blade.

BRIEF DESCRIPTION OF THE INVENTION

In an embodiment, a ceramic matrix composite (CMC) turbine blade includes a root region, a narrowed neck region extending from the root region, and a hub region extending from the narrowed neck region. At least one central CMC ply extending from the root region is interwoven with at least one insert extending toward the narrowed neck region from the hub region.

In another embodiment, a method of forming a ceramic matrix composite (CMC) turbine blade includes interweaving at least one central CMC ply extending from the root region with at least one insert extending toward the narrowed neck region from the hub region. The CMC turbine blade includes a root region, a narrowed neck region extending from the root region, and a hub region extending from the narrowed neck region.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a ceramic matrix composite (CMC) turbine blade including at least one central ply interwoven around an insert and a method of forming a CMC turbine blade. Embodiments of the present disclosure, for example, in comparison to concepts failing to include one or more of the features disclosed herein, provide an increased robustness to the narrowed neck region of the CMC turbine blade while permitting incorporation of the CMC turbine blade into a conventional turbine rotor, provide a more robust CMC airfoil system, reduce fallout of parts, decrease maintenance costs, mitigate laminar crack growth in the narrowed neck region in a ply direction, mitigate laminar crack growth in the narrowed neck region in a radial direction, mitigate laminar crack growth in the narrowed neck region in an axial direction, reduce peel within the narrowed neck region, reduce interlaminar tensile (ILT) stress within the narrowed neck region, or combinations thereof.

A central ply, as used herein, refers to any CMC ply that directly flanks an insert or extends between two inserts on the airfoil side of the narrowed neck region.

An insert, as used herein, refers to any structure that is placed between CMC plies to increase a stack height of the CMC plies and hence increase the thickness of the CMC turbine blade in an axial direction relative to radial locations lacking the insert and that remains as a structural element in the final CMC turbine blade.

A hub region, as used herein, refers to the radial region of a CMC turbine blade where the airfoil is exposed to the hot gas path and may be defined by a circumferential surface or blade platform.

A narrowed neck region, as used herein, refers to a region of a CMC turbine blade between the hub region and the root region. The narrowed neck region has a decreased thickness in the radial direction relative to the thickness of the hub region and the root region as a result of tapering inserts or no inserts between the CMC plies in the narrowed neck region.

Figure 1:
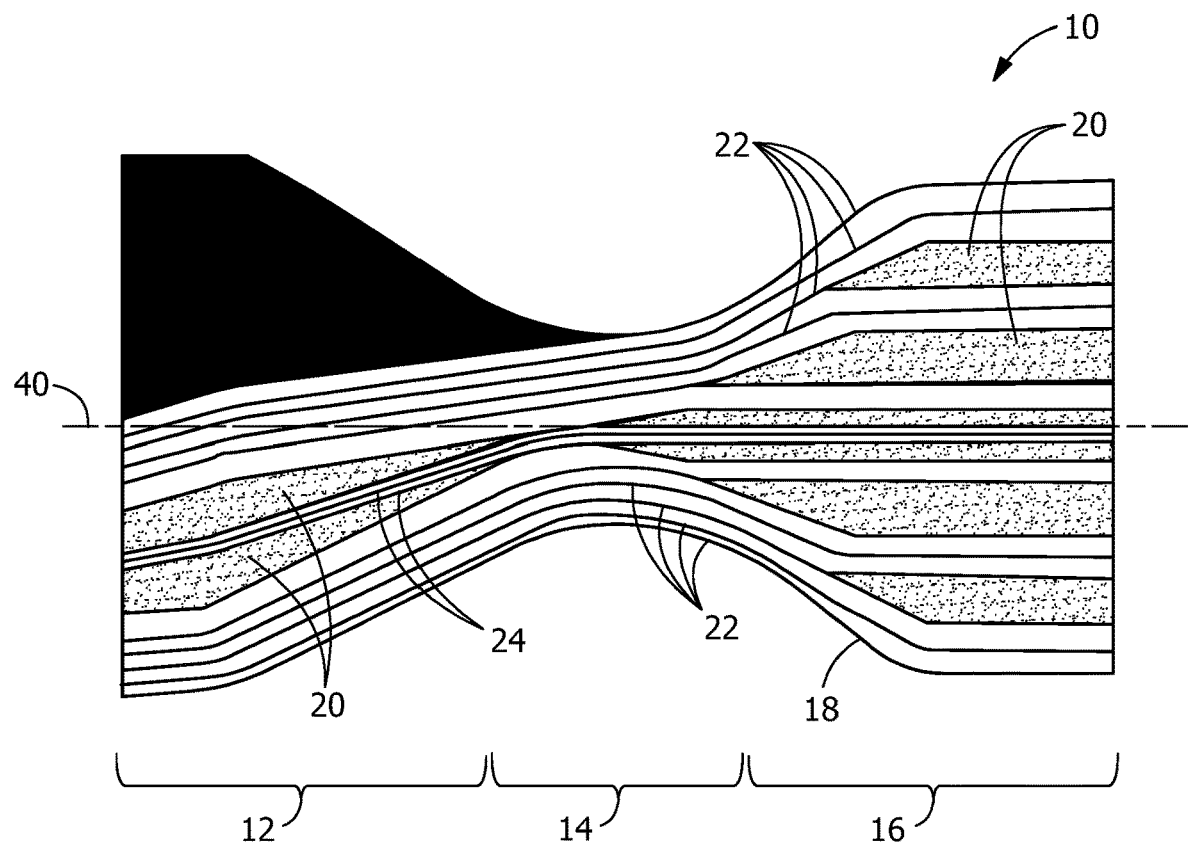
FIG. 1 is a cross sectional view of a portion of a CMC turbine blade.

Referring to FIG. 1, the CMC turbine blade 10 includes a hub region 12 extending from a narrowed neck region 14. The CMC turbine blade 10 also includes a root region 16 extending from the narrowed neck region 14 on the opposite side of the narrowed neck region 14 from the hub region 12. The root region 16 includes a dovetail 18 that maintains the CMC turbine blade 10 in a slot of a rotor (not shown). The mid-plane 40 of the CMC turbine blade 10 is also indicated in FIG. 1.

CMC plies 22, 24 extend from the root region 16, through the narrowed neck region 14, and into the hub region 12. An hourglass profile including the narrowed neck region 14 of the CMC turbine blade 10 is achieved by inserts 20 located between certain CMC plies 22, 24. The inserts 20 may have different shapes as shown in FIG. 1 to provide a predetermined profile to the CMC turbine blade 10. The inserts 20 generally are wedge-shaped. Some of the inserts 20 are located primarily in the hub region 12 and taper as they extend toward the narrowed neck region 14. Other inserts are located primarily in the root region 16 and taper as they extend toward the narrowed neck region 14. The CMC plies 22, 24 include outer CMC plies 22 that are located at or near the top or bottom of the stack of CMC plies 22, 24 and central CMC plies 24 that are located at or near the center of the stack of CMC plies 22, 24. At least a portion of the narrowed neck region 14 includes an axial stack of CMC plies 22, 24 with no inserts 20 extending between the CMC plies 22, 24 of the stack from the hub region 12 or the root region 16.

Figure 2:
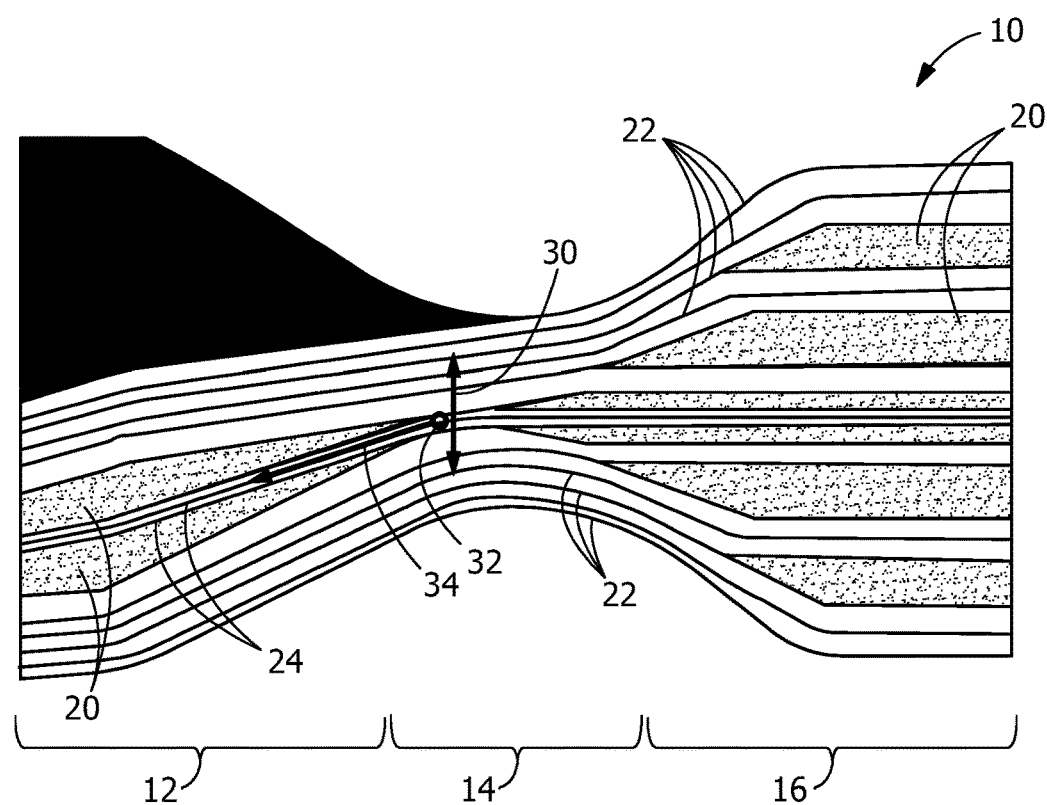
FIG. 2 is a cross sectional view showing propagation of a crack in the CMC turbine blade of FIG. 1.

Referring to FIG. 2, external forces on the CMC turbine blade 10 during service generate an ILT stress 30 that is primarily in the circumferential direction and is highest at or near the center of the stack of CMC plies 22, 24 corresponding to one of the central CMC plies 24 and centered in the narrowed neck region 14. Axially (in and out of the page in FIG. 2), the highest bulk ILT stress 30 is focused at or about halfway between the leading edge and the trailing edge of the CMC turbine blade 10. Under extreme conditions, the ILT stress 30 may lead to initiation of a crack at an initiation point 32 at or near the mid-plane 40 in the narrowed neck region 14 of the CMC turbine blade 10. This crack then tends to propagate laminarly along a path between two neighboring CMC plies 24 from the initiation point 32 in a propagation direction 34 toward the hub region 12.

Figure 3:
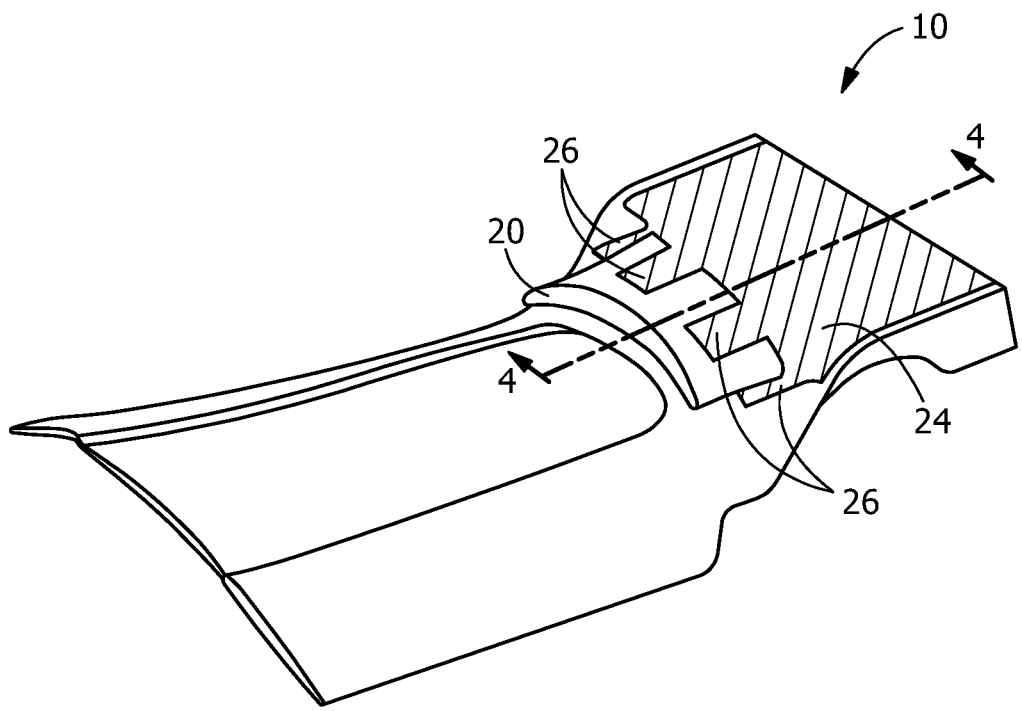
FIG. 3 is a partial sectional perspective view of a CMC turbine blade in an embodiment of the present disclosure.
Figure 4:
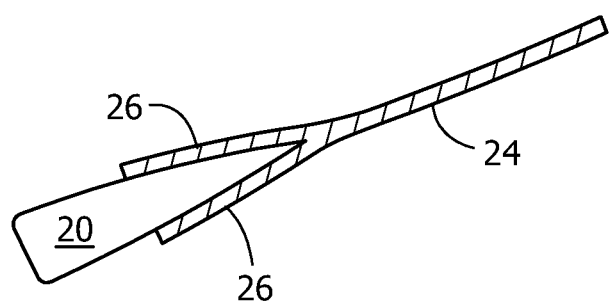
FIG. 4 is a partial cross sectional side view of an insert and a central CMC ply of the CMC turbine blade of FIG. 3 along plane 4-4.

Referring to FIG. 3, the CMC turbine blade 10 includes a central CMC ply 24 that has been separated into central CMC ply strips 26 along a portion of the central CMC ply 24 that alternatingly go over and under an insert 20 to interweave the central CMC ply 24 to the insert 20. Alternatively, the insert 20 may have insert CMC ply strips that alternatingly go over and under a central CMC ply 24 to interweave the insert 20 to the central CMC ply 24. This interweaving is focused on the narrowed neck region 14 of the blade shank of the CMC turbine blade 10. FIG. 4 shows a view looking across the insert 20 and showing strips 26 of the central CMC ply 24 going above and below the insert 20.

Figure 5:
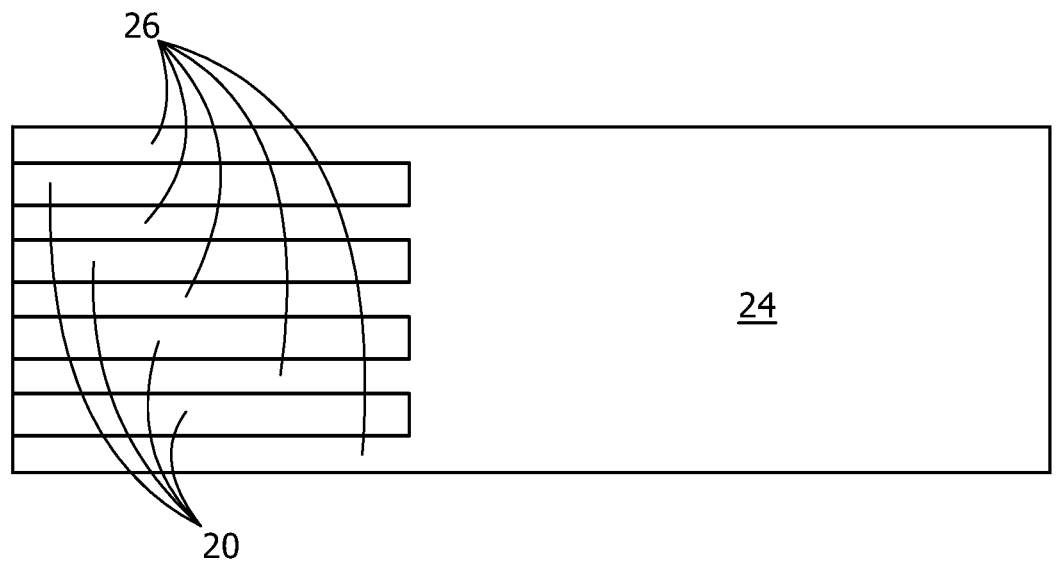
FIG. 5 is a top view of an insert and a central CMC ply of the CMC turbine blade of FIG. 3.

FIG. 5 shows a top view looking down on the central CMC ply 24 having central CMC ply strips 26 interwoven above and below the insert 20. A neighboring central CMC ply 24 may also be modified and interwoven with the central CMC ply 24 to provide a smoother layer for subsequent CMC plies 22, 24 in the stack.

Figure 6:
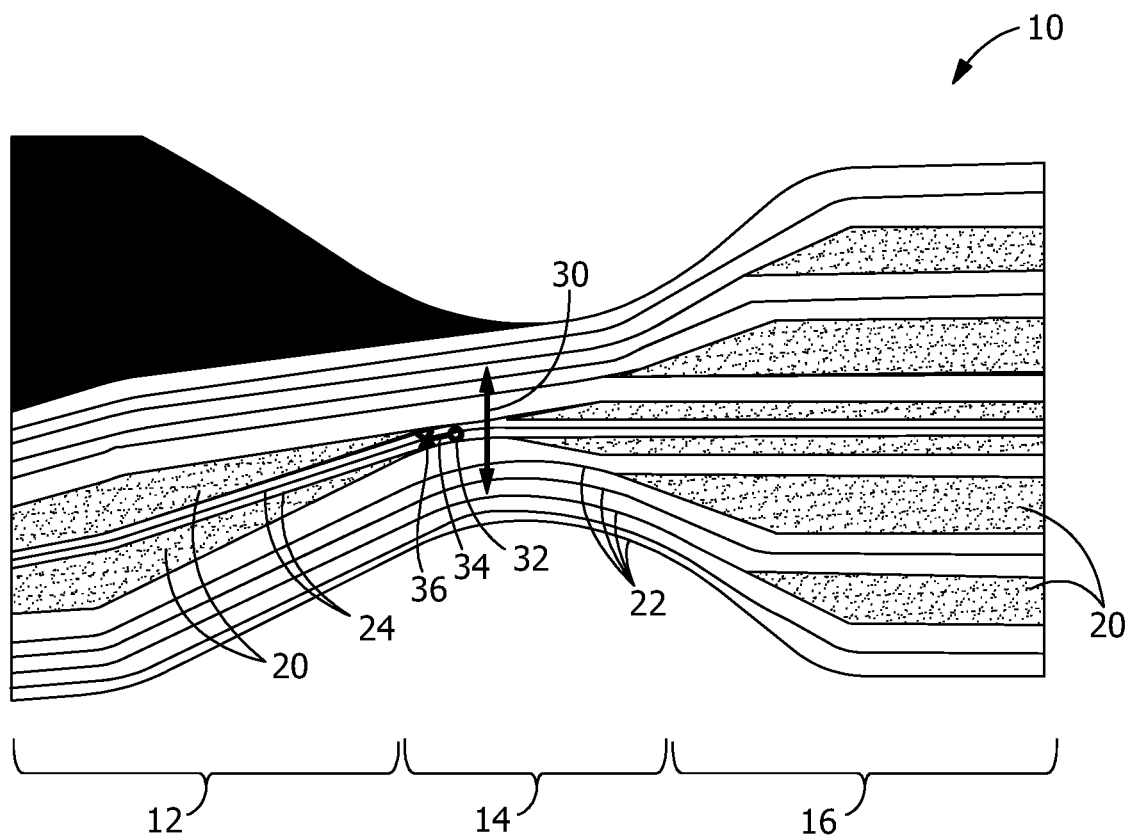
FIG. 6 is a cross sectional view showing propagation of a crack in the CMC turbine blade of FIG. 3.

Referring to FIG. 6, external forces on the CMC turbine blade 10 during service generate an ILT stress 30 that is primarily in the circumferential direction and is highest at or near the center of the stack of CMC plies 22, 24 in the narrowed neck region 14. Under extreme conditions, the ILT stress 30 may lead to initiation of a crack at an initiation point 32 in the narrowed neck region 14 of the CMC turbine blade 10. This crack then tends to propagate between central CMC plies 24 from the initiation point 32 in a propagation direction 34 toward the hub region 12, but when the crack reaches the edge 36 of the interwoven portion at the tip of the insert 20, there is not as clear of a path to follow and continued propagation of the crack is inhibited or stopped when it reaches the edge 36.

Figure 7:
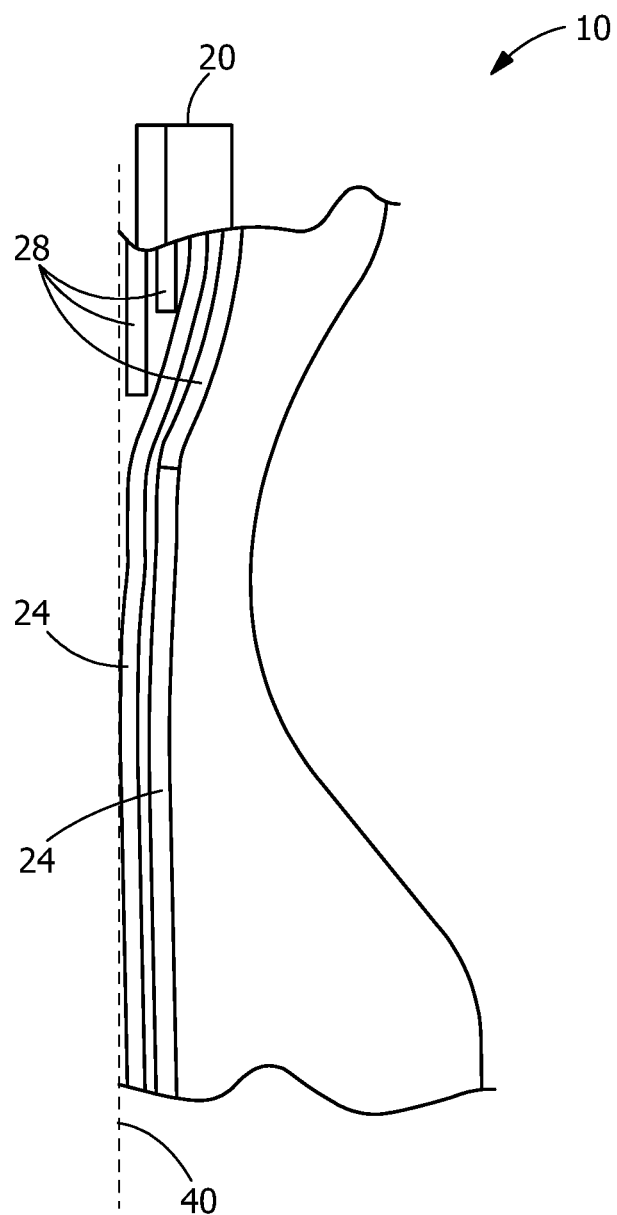
FIG. 7 is a cross sectional view of a CMC turbine blade with an insert having insert CMC plies interwoven with a central CMC ply.

Referring to FIG. 7, the CMC turbine blade 10 includes an insert 20 that includes insert CMC plies 28. In some embodiments, the insert 20 is a stack or a laminate of the insert CMC plies 28. Two insert CMC plies 28 direct a central CMC ply 24 away from the mid-plane 40 and the central CMC ply 24 inserts between those two insert CMC plies 28 and a third insert CMC ply 28 (outermost, rightmost in FIG. 7) of the insert 20. The end of a neighboring central CMC ply 24 terminates at the end of the third insert CMC ply 28. Only a portion of the CMC turbine blade 10 is shown in FIG. 7 and only some of the features of that portion are shown for clarity. Although only one central CMC ply 24 is shown interwoven with insert CMC plies 28 in FIG. 7, multiple central CMC plies 24 may be interwoven with the insert CMC plies 28 of one or more inserts 20 in a CMC turbine blade 10.

In some embodiments, the interweaving of central CMC plies 24 reduces the chance of laminar crack growth along or parallel to the ply direction. Laminar crack growth is the primary and easiest form or crack propagation in the CMC turbine blade 10. In laminar crack growth, the crack propagates parallel to the fiber direction along the CMC ply 24. In contrast, a translaminar crack is one that bridges or crosses between the fiber and plies, which is much more likely to be stopped, as it required breaking of individual fiber strands to keep growing. The interweaving of CMC plies 24, 28 promotes the laminar plies to divert from the middle of the CMC turbine blade 10, which requires more energy and thus inhibits further propagation of the crack.

The interweaving may occur in any manner that reduces the propensity of a crack to migrate into the interwoven region. In some embodiments, the interweaving includes separating one or more CMC plies 24, 28 into strips and interweaving the strips. In some embodiments, the CMC plies 24, 28 being separated into strips are abutting CMC plies 24, 28. In some embodiments, the CMC plies 24, 28 are interwoven without being separated into strips. In some embodiments, a portion of a central CMC ply 24 is spliced or cut in order to weave the CMC ply strips 26 into the insert CMC plies 28.

The central CMC ply strips 26 or the insert CMC ply strips may have any width that permits interweaving but maintains the structural integrity of the CMC ply 24, 28. In some embodiments, the width of the central CMC ply strips 26 or the insert CMC ply strips is about 2.5 cm (about 1 in.), alternatively in the range of about 2 cm to about 3 cm (about 0.8 in. to about 1.2 in), alternatively about 1 cm (about 0.4 in.) or greater, alternatively about 2 cm (about 0.8 in.) or greater, alternatively about 3 cm (about 1.2 in.) or greater, alternatively about 3 cm (about 1.2 in.) or less, alternatively about 7.6 cm (about 3.0 in.) or less, or any value, range, or sub-range therebetween.

In some embodiments, the central CMC plies 24 run from the root region 16 and terminate at the blade cavity of the hub region 12 and are interwoven along the inserts 20. This interweave aids in the robustness of the narrowed neck region 14 by crossing plies and thus the load paths. When an ILT crack occurs in the narrowed neck region 14, the interweave aids in reducing the propensity of the crack to migrate up to the blade cavity.

In some embodiments, a central CMC ply 24 extends from the root region 16 but terminates prior to the blade cavity of the hub region 12. In some embodiments, a central CMC ply 24 extends from the root region 16 and terminates at an insert 20, at an insert CMC ply 28 of an insert 20, or between insert CMC plies 28 of an insert 20.

The interweaving is preferably compatible with current methods of fabrication of CMC turbine blades 10, including implementation for a hollow CMC turbine blade 10 because of the incorporation of inserts 20.

Methods of the present disclosure form CMC turbine blades 10 that are compatible with rotors for attachment by a dovetail 18. Alternatively, methods that increase the thickness of the narrowed neck region 14 may mitigate the ILT stresses, but such methods increase manufacturing costs and may produce a CMC turbine blade that does not fit in a conventional wheel or rotor.

The interweaving of the central plies 24 with the inserts 20 may be achieved by any of a number of different weave patterns and inserts 20. In some embodiments, the inserts 20 are pre-cured preforms. In some embodiments, the inserts 20 include insert CMC plies 28. In some embodiments, the insert CMC plies 28 are separated into strips. In some embodiments, the central CMC plies 24 are separated into central CMC ply strips 26. In some embodiments, neither the central CMC plies 24 nor the insert CMC plies 28 are separated into strips but instead the central CMC plies 24 are inserted between insert CMC plies 28 of inserts 20 to achieve the interweaving. In some embodiments, the inserts 20 direct the central CMC plies 24 away from the mid-plane 40 of the CMC turbine blade 10 and the first insert CMC ply of the insert 20 is located off the mid-plane 40.

In some embodiments, the inserts 20 direct one or more central CMC plies 24 away from the mid-plane 40 of the CMC turbine blade 10. In some embodiments, the insert 20 directs a central CMC insert about 1.3 mm (about 0.05 in.) or more away from the mid-plane 40, alternatively about 2.5 mm (about 0.1 in.) or more from the mid-plane 40, or any amount, range, or sub-range therebetween. In some embodiments, an outermost insert CMC ply 28 is located about 1.3 mm (about 0.05 in.) or more from the mid-plane 40, alternatively about 2.5 mm (about 0.1 in.) or more from the mid-plane 40, or any amount, range, or sub-range therebetween.

In some embodiments, the inserts 20 include plies that are interwoven with the central CMC plies 24. Non-continuous ply drops are created along the radial direction. This arrangement provides a radial discontinuity that is expected to help impede crack progression.

SiC-based or ceramic-based composites with ceramic matrix exhibit a higher stiffness in the direction perpendicular to the fiber. This higher stiffness or modulus resolves itself within the ILT stress, which is not an issue or common with epoxy-based or resin-based matrix systems, which have a matrix modulus that is much lower than the fiber modulus.

The CMC turbine blade 10 may be made using any ceramic matrix composite materials. In some embodiments, at least a portion of the hub region 12, the narrowed neck region 14, and the root region 16 is formed from a CMC. In some embodiments, most, all, or substantially all of the hub region 12, the narrowed neck region 14, and the root region 16 is formed from a CMC. In some embodiments, the CMC blade 10 is monolithic, with the hub region 12 and the narrowed neck region 14 being integral and with the hub region 12 and the root region 16 being integral.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A ceramic matrix composite (CMC) turbine blade comprising:
   a root region;
   a narrowed neck region extending from the root region; and
   a hub region extending from the narrowed neck region;
   wherein at least one central CMC ply extending from the root region into the narrowed neck region is interwoven with at least one insert extending toward the narrowed neck region from the hub region by a plurality of CMC ply strips of one of the at least one central CMC ply and the at least one insert being alternatingly interwoven above and below the other of the at least one central CMC ply and the at least one insert.

2. The CMC turbine blade of claim 1, wherein the at least one central CMC ply being interwoven with the at least one insert mitigates laminar crack growth along the at least one central CMC ply.

3. The CMC turbine blade of claim 1, wherein the root region comprises a dovetail.

4. The CMC turbine blade of claim 1, wherein the plurality of CMC ply strips are a plurality of central CMC ply strips of the at least one central CMC ply alternatingly interwoven above and below the at least one insert.

5. The CMC turbine blade of claim 1, wherein the plurality of CMC ply strips are a plurality of insert CMC ply strips of the at least one insert alternatingly interwoven above and below the at least one central CMC ply.

6. The CMC turbine blade of claim 1, wherein the at least one insert directs the at least one central CMC ply away from a mid-plane of the CMC turbine blade.

7. The CMC turbine blade of claim 1, wherein the at least one insert comprises a plurality of insert CMC plies and the at least one central CMC ply is interwoven between at least a pair of the plurality of insert CMC plies.

8. The CMC turbine blade of claim 7, wherein one of the at least a pair of the plurality of insert CMC plies is located 1.2 mm or more from a mid-plane of the CMC turbine blade.

9. A method of forming a ceramic matrix composite (CMC) turbine blade comprising a root region, a narrowed neck region extending from the root region, a hub region extending from the narrowed neck region, the method comprising:

interweaving at least one central CMC ply extending from the root region into the narrowed neck region with at least one insert extending toward the narrowed neck region from the hub region by a plurality of CMC ply strips of one of the at least one central CMC ply and the at least one insert being alternatingly interwoven above and below the other of the at least one central CMC ply and the at least one insert.

10. The method of claim 9, wherein the interweaving mitigates laminar crack growth along the at least one central CMC ply.

11. The method of claim 9 further comprising forming a dovetail in the root region.

12. The method of claim 9, wherein the plurality of CMC ply strips are a plurality of central CMC ply strips of the at least one central CMC ply and the interweaving comprises alternatingly interweaving the plurality of central CMC ply strips of the at least one central CMC ply above and below the at least one insert.

13. The method of claim 9, wherein the plurality of CMC ply strips are a plurality of insert CMC ply strips of the at least one insert CMC ply and the interweaving comprises alternatingly interweaving the plurality of insert CMC ply strips of the at least one insert above and below the at least one central CMC ply.

14. The method of claim 9, wherein the interweaving further comprises directing the at least one central CMC ply away from a mid-plane of the CMC turbine blade.

15. The method of claim 9, wherein the interweaving comprises alternatingly interweaving the at least one central CMC ply between at least a pair of a plurality of insert CMC plies of the at least one insert.

16. The method of claim 15 further comprising locating one of the at least a pair of the plurality of insert CMC plies 1.2 mm or more from a mid-plane of the CMC turbine blade.

17. The method of claim 9 further comprising separating a plurality of abutting insert CMC plies of the at least one insert.

18. The method of claim 17, wherein the interweaving further comprises interweaving the at least one central CMC ply with the plurality of abutting insert CMC plies.

19. The method of claim 9, wherein the interweaving further comprises inserting the at least one insert into an opening in the at least one central CMC ply formed by the plurality of CMC ply strips.

20. The CMC turbine blade of claim 1, wherein the at least one insert is a pre-cured preform.

* * * * *